United States Patent [19]

Mehan

[11] Patent Number: 4,854,196

[45] Date of Patent: Aug. 8, 1989

[54] METHOD OF FORMING TURBINE BLADES WITH ABRADABLE TIPS

[75] Inventor: Richard L. Mehan, Scotia, N.Y.

[73] Assignee: General Electric Company, Schenectady, N.Y.

[21] Appl. No.: 198,526

[22] Filed: May 25, 1988

[51] Int. Cl.$^4$ .............................................. B21K 3/04
[52] U.S. Cl. ................................. 76/101 R; 427/190; 427/398.1
[58] Field of Search .......... 76/101 R; 427/190, 398.1; 428/689, 702

[56] References Cited

U.S. PATENT DOCUMENTS

| | | | |
|---|---|---|---|
| 3,890,456 | 6/1975 | Dils | 427/123 |
| 4,439,470 | 3/1984 | Sievers | 427/250 |
| 4,608,128 | 8/1986 | Farmer et al. | 204/16 |
| 4,741,973 | 5/1988 | Condit et al. | 428/570 |

Primary Examiner—Roscoe V. Parker
Attorney, Agent, or Firm—Paul E. Rochford; James C. Davis, Jr.; James Magee, Jr.

[57] ABSTRACT

A method of embedding an oxidation resistant abrasive material in the tip of a turbine blade is taught. The oxidation resistant abrasive may be aluminum oxide. Its low density is increased by coating fine particles with platinum metal to achieve a density greater than that of the metal of the blade tip. The blade tip is then melted locally to provide a pool of melt into which the high density aluminum oxide can be inserted. Freezing the melt embeds the aluminum oxide in the blade tip.

1 Claim, No Drawings

METHOD OF FORMING TURBINE BLADES WITH ABRADABLE TIPS

BACKGROUND OF THE INVENTION

The present invention relates generally to formation of abradable tips on turbine blades and to articles formed by the methods. More particularly, it relates to a method for forming a particle which is adapted to incorporation into the tips of turbine blades to provide abradable properties to the blade tips and to the article formed by the method.

The use of turbine blades with abrasive materials in the tip is known. One reason for such products and the use of such products is in developing a clearance between the end of the turbine blade and the housing in which the blades rotate.

It is known that the gas which is compressed with in a compression zone by operation of the compression stage of a gas turbine seeks escape from the zone through any available opening in the manner which is normal and characteristic for gaseous materials. One opening is at the space in the clearance between the edge of a turbine blade and the housing in which the blade rotates. It has been found advantageous and desirable to keep the clearance between the blade edge and the housing as small as is feasible. This is a difficult feat for an apparatus in which the blades rotate on a shaft within an enclosing housing at about 12,000 revolutions per minute.

Very close tolerances between the end of the blade and the enclosing housing are desirable but the maintenance of such a small clearance can be difficult as stress is applied to the various parts of the engine and slight movement of the parts takes place.

One way in which a close clearance has been maintained is by the incorporation of abrasive material in the blade end so that if it makes slight contact with the enclosing housing it is able to abrade and wear away the material at the place where contact was made.

There are a number of characteristics which are desirable in an abrasive blade end and in the abrasive material which is incorporated into the blade end. One such characteristic is that the abrasive material be resistant to oxidation in the engine environment. Another desirable characteristic is that the material incorporated in the blade end be significantly abrasive. Another characteristic is that the abrasive material incorporated into the blade end be chemically compatible with the metal of the blade in the solid state form during the full useful life of the blade itself. An additional requirement is that the particle which is to perform the abrasive function be capable of being incorporated into the blade.

In this last regard, one of the most effective manners in which such particles can be incorporated into the blade end is by causing a melting of the turbine blade tip, as by laser melting, and by incorporating the material to serve the abrasive function into the melted end of the blade. In order for an abrasive particle to be incorporated into the melted end of the turbine blade, the density of the particle must be greater than about 8 grams per cubic centimeter. If the density is lower then the particles will float on the top of the melt formed at the tip of a turbine blade and will not be incorporated in the blade tip.

A material such as tantalum carbide has a desirable set of properties in that it has a density of greater than 8 grams per cubic centimeter and serves usefully as an abrasive. Tantalum carbide particles have in fact been incorporated into the tips of turbine blades to serve as abrasive material. However, although they meet many of the criteria for such materials, they do not have sufficient oxidation resistance. A survey of readily available abrasive materials which have suitable thermal stability and oxidation resistance indicates that most have densities lower than the 8 gram per cubic centimeter which is required for direct incorporation into the melted end of a turbine blade tip. There are some materials which are available and might serve as abrasive materials in the tips of turbine blades and which meet the technical requirements which are outlined above. These materials are described in a publication of R. L. Fleischer, entitled "High Temperature, High Strength Materials—An Overview", July 1985. However, the use of these materials would require a considerable research effort to establish the properties of the materials and the feasibility of their being incorporated and operating suitably in a turbine blade tip.

Rather than dealing with some of these materials which are not well known or well characterized, it is recognized that it would be highly desirable to be able to use more conventional and better characterized abrasive materials. This is particularly true of materials which are well known to have fine abrasive properties and which nevertheless have the oxidation resistant in addition to the set of required properties which are outlined above. One such abrasive material is aluminum oxide. This material meets all of the required criteria for use in a turbine blade tip, except for the density criteria. The aluminum oxide has a density of 3.96 grams per cubic centimeter and thus has only about half of the density required for use in a turbine blade tip.

BRIEF STATEMENT OF THE INVENTION

It is accordingly one object of the present invention to provide a method by which an ordinary abrasive material such as aluminum oxide can be greatly increased in density.

Another object is to provide a heavy particle for incorporation into the melted end of a turbine blade tip.

Another object is to provide a turbine blade tip which has abrasive material mounted therein and adapted to impart abrasive properties to the turbine end tip.

Another object is to provide a method by which the turbine blade tip of convention construction can be rendered abrasive by incorporation therein of ordinary abrasive material.

Other objects will be in part apparent and in part pointed out in the description which follows.

In one of its broader aspects, the object of the present invention may be achieved by developing a coating of platinum onto abrasive particles of ordinary construction so that the plated particle has a density in excess of 8 grams per cubic centimeter. The heavy platinum coated particles are then introduced into the melt at the end of a turbine blade tip and the molten portion of the blade tip is frozen while the platinum bearing particles are submerged therein.

In another of its aspects, the objects of the invention can be achieved by providing a turbine blade tip having mounted therein ordinary abrasive particles adapted to provide abrasive properties to the blade tip.

DETAILED DESCRIPTION OF THE INVENTION

It is well known that aluminum oxide is an abrasive material and aluminum oxide abrasive materials having different particle sizes are available commercially. One such material is available in a 200-230 mesh size. The particles of this material have an average diameter of about 65 $\mu$m. The density of such aluminum oxide abrasive particles is about 4 grams per cubic centimeter.

I have found that it is feasible to significantly increase the density of the abrasive particles on an individual particle basis by forming deposits of platinum on the surfaces of the particles.

It is known that platinum has a density of about 21.45 grams per cubic centimeter. I have found that by forming a platinum layer of 4 $\mu$m thickness on the particles of aluminum oxide of about 65 $\mu$m diameter that the effective density of the particles is raised from about 4 grams per centimeter to about 9.0 grams per cubic centimeter for the coated particles.

I have further established that a particle of 9 grams per cubic centimeter is sufficiently heavy to sink into a nickel base alloy melt pool formed as by laser heating on the end of a turbine blade tip.

Moreover, I have determined that any dissolution of the platinum subsequent to introducing the platinum coated particles into the nickel-base alloy pool, either by alloying in the melt or as a result of solid state reaction with the solidified blade material, would leave the aluminum oxide particles entrapped within the melt pool and able to perform its abrasive function after the melt pool has frozen on the turbine blade tip.

EXAMPLE 1

One way in which I have established that any dissolution of the platinum of the coating on the aluminum oxide particles will not be inordinately large is by melting the tip of a turbine blade formed of Rene' 80 by a TIG welding tool and inserting a platinum wire into the molten Rene' 80 weld pool. The solidified end of the wire in its solidified Rene' 80 metal matrix was sectioned and examined metallographically. It was observed that no gross dissolution of the platinum wire had occurred.

EXAMPLE 2

A sample of 60 micron diameter aluminum was obtained. The alumina powder was classified by sifting through wire screens in such a way that a majority of the powder was between 200 and 230 mesh size.

Platinum was applied to 200 to 230 mesh particles of aluminum oxide by electroless plating. In carrying out the process, 60 grams of platinum coated aluminum oxide powder was prepared from a commercially available proprietary "electroless" plating solution using a procedure essentially as follows:

The first step was to sensitize the aluminum oxide powder. For this purpose the powder was suspended for 2 minutes in a solution containing 10 grams per liter of tin chloride and 40 milliliters per liter of hydrochloric acid. The second step was to water wash the sensitized powder and to filter it. The third step was to activate the aluminum oxide powder. For this purpose the powder was suspended for five minutes in a solution containing 4 grams per liter of palladium chloride ($PdCl_2$) and having a pH of 3.

The fourth step was to water wash and filter the activated powder. By a fifth step the activated powder was electroless plated. For this purpose the powder was suspended for 20 minutes an a commercially available proprietary bath composition. This electroless plating was followed by a water wash and filtration of the plated powder.

In the process described above, the first four steps are employed to put a monolayer of palladium on the surface of the aluminum oxide powder. The palladium acts as a catalyst for the initial electroless deposition of platinum. The plated platinum thereafter catalyzes the further reduction of platinum from solution. In this example, the plating bath contained the desired amount of platinum and the plating was continued until eventually all of the platinum had plated out of solution. The 60 grams of powder were obtained by this method as it eliminates the need for long term stability of the bath. Using this procedure, 95% of the platinum in the bath was consumed. The method of this example is essentially a batch process so that a new batch is prepared for each batch of powder. Although any size bath may be used for this type experiment, for this example several 12 gram batches were plated in about 2 liters of plating bath.

It was found that, because there is some tendency for the platinum to plate out on the vessel walls to form flakes, it is desirable to sieve the powder before it is used for incorporation into a melt formed on the tip of a turbine blade by laser heating at similar process.

EXAMPLE 3

A sample of 60 micron diameter alumina powder was obtained. The alumina powder was classified by sifting through wire screens in such a way that a majority of the powder was between 200 and 230 mesh size.

This powder was heated to a temperature of about 1100° C. for 1 hour to drive out the moisture and other volatile contaminants which might be present. A portion of the powder was weighed and mixed with a platinum metallo-organic solution. The solution employed was a commercially available composition obtained from Engelhard Corporation and identified as solution No. 9450. The solution contained about 26% platinum by weight. The amount of metallo-organic solution used was an amount just sufficient to completely soak the alumina powder. This procedure minimized the free platinum formation in locations other than the surfaces of alumina particles. This mixture of alumina and organometallic composition was then slowly heated to a temperature of about 400° C. to drive out most of the organics. The heating was done in air. Subsequently, the powder was heated to a temperature of about 800° C. to remove additional organic material from the powder. Typically a hold time of about 1 hour was found sufficient at 800° C. to deposit a thin layer of platinum on the alumina powder. This powder was weighed to determine the weight gain. From the weight gain an average coating thickness was calculated. The above procedure was repeated until the coated alumina powder showed about a 71% weight increase. This level of weight increase of just more than 70% corresponds to an average coating thickness of about 4 microns on a 60 micron alumina particle. This coating of the 60 micron alumina particles with a 4 micron coating was accomplished with 4 coating cycles essentially as described above. The coated alumina powder was examined in a scanning electron microscope to evaluate the coating characteristics. The coatings observed lead to the conclusion that the metallo-organic process as described here can be used to coat alumina powder with platinum. One advantage of this process is that it is simple and does not require specialized equipment.

EXAMPLE 4

A sample of aluminum oxide powder was coated by a sputtering process. In this sputtering process, tungsten metal was used in order to avoid the expense of buying and fabricating a platinum sputtering target. The assumption is made that if tungsten can be sputtered onto alumina particles, platinum can also be sputtered onto such particles. The applicant understands that the platinum sputtering rate is greater than that of tungsten so that if tungsten could be used successfully in the sputter coating of aluminum oxide particles, it was presumed that platinum could be used as well. This information was obtained from Applied Coatings Incorporated of Columbus, Ohio and the tungsten sputtering of the aluminum oxide powder was carried out by the Applied Coatings Company at their Columbus, Ohio facility. The material prepared by the Applied Coatings Company was examined by scanning electron microscope and was observed to suitable for incorporation into the melt at the tip of a turbine blade.

EXAMPLE 5

Material prepared by the methods described in Examples 2, 3 and 4 was weighed and examined. It was determined that it was feasible to prepare the material with a density of about 9 by these methods.

To incorporate this high density abrasive base material into a metal having a lower density requires that the surface of the lower density metal be melted. Such melting can be done by plasma heating or by laser heating or by other similar application of heat at a high rate to a surface of a metal article such as a tip of a turbine blade.

Once the surface has been melted, the high density abrasive powder prepared as described above is quickly applied to the molten surface to be incorporated into the surface of the melt and accordingly into the surface of the article.

One way in which this application of the abrasive can be accomplished is by applying a heat energy to the surface of an article in the manner of application of heat for welding. A laser type of weld type heating is applied to a blade end for example by a laser welding tool and a hopper of the high density abrasive powder is affixed to the tool so that it moves with the tool as the weld heat is applied and a weld pool is formed and dispenses the high density abrasive powder into the weld pool continuously immediately after the pool is formed as for example at the end of a turbine blade.

A turbine blade having a conventional abrasive such as aluminum oxide embedded in the blade tip is formed in this fashion.

What is claimed and sought to be protected by Letters Patent of the United States is as follows:

1. Method for imparting abrasive properties to the tip of a turbine blade which comprises coating aluminum oxide powder with platinum metal to increase the density of the powder to a density greater than that of the metal of the tip of the turbine blade, heating the tip of the turbine blade to cause a localized melting at the tip, applying the platinum coated powder to the molten tip of the blade, and freezing the melt at the blade tip to embed the aluminum oxide abrasive material into the tip of the turbine.

* * * * *